United States Patent
Chupin et al.

(10) Patent No.: US 7,222,309 B2
(45) Date of Patent: May 22, 2007

(54) SYSTEM AND METHOD OF A WEB BROWSER WITH INTEGRATED FEATURES AND CONTROLS

(75) Inventors: Fabrice Chupin, Los Altos, CA (US); David Smith, Cupertino, CA (US); Scott Jarol, Gig Harbor, WA (US); David Redkey, Santa Clara, CA (US)

(73) Assignee: Earthlink, Inc., Atlanta, GA (US)

( * ) Notice: Subject to any disclaimer, the term of this patent is extended or adjusted under 35 U.S.C. 154(b) by 791 days.

(21) Appl. No.: 10/379,100

(22) Filed: Mar. 4, 2003

(65) Prior Publication Data

US 2003/0222902 A1 Dec. 4, 2003

Related U.S. Application Data

(62) Division of application No. 09/585,583, filed on Jun. 2, 2000, now abandoned.

(60) Provisional application No. 60/137,269, filed on Jun. 2, 1999.

(51) Int. Cl.
  *G06F 15/00* (2006.01)
  *G06F 13/00* (2006.01)
(52) U.S. Cl. ................................. 715/848; 715/854

(58) Field of Classification Search ................ 715/848, 715/757, 849, 853, 854, 763, 765; 709/213, 709/229
See application file for complete search history.

(56) References Cited

U.S. PATENT DOCUMENTS 5,732,232 A * 3/1998 Brush et al. ................ 715/751
5,757,669 A * 5/1998 Christie et al. ............. 709/205
6,731,314 B1 * 5/2004 Cheng et al. ............... 715/848

* cited by examiner

*Primary Examiner*—Cao (Kevin) Nguyen

(57) ABSTRACT

A web browser for Internet access distinguishes between client users and supervisory users. Supervisory users are authorized to create or modify local content access settings to Internet resources that are stored in data structures. Client users are prevented from accessing these local content access settings. When a client user logs on, the local content access settings are retrieved from a local data structure and additional content access control information is retrieved from a remote data structure. Modules coordinate local and remote content access settings to regulate client access to Internet resources. Client access is readily modified through the setting of local content access settings by a local supervisor and by the selection of the remote site(s) contacted for additional content access control information. An interactive agent assists client users during Internet access.

17 Claims, 7 Drawing Sheets

SYSTEM AND METHOD OF A WEB BROWSER WITH INTEGRATED FEATURES AND CONTROLS

CROSS REFERENCE TO RELATED APPLICATIONS

This patent application is a divisional application of the U.S. patent application Ser. No. 09/585,583 filed Jun. 2, 2000 now abandoned entitled "System and Method of a Web Browser with Integrated Features and Controls," which claimed priorty to the U.S. provisional application Ser. No. 60/137,269 filed on Jun. 2, 1999, which is incorporated in its entirety and made part hereof.

BACKGROUND

1. Field of the Invention

The present invention relates generally to a web browser and methods thereof and more specifically to a web browser integrated with, for example, mail, chat and/or search functions having embedded content filtering and methods thereof.

2. Description of Related Art

Information made available through the Internet in the form of Web Sites. Chat Rooms and Electronic Mail, is generally unregulated. Internet Directory Services and Search Engines such as Yahoo®, HotBot® and others can provide order to the subject matter of the vast amount of information available. However Directory Servers are generally limited to categorizing Web Sites based on Keywords supplied by the site's content provider. Actual content is generally not verified. Internet Search Engines typically provide results by matching the same Keywords to a specific user query to generate a list of matches for each specific query. Again, actual content of the matches is generally not checked. For some users, for example children, such unregulated access is undesirable. In addition, some young users have difficulty in navigating through the vast Internet resource and would benefit if assistance in accessing appropriate information could be made available.

Popular Internet Browsers such as the Netscape Navigator® and the Microsoft Internet Explorer® provide some of content screening. However, this screening is generally limited only to Web Sites and typically involves several levels of setup interaction on the part of a parent or guardian to become active. Typically, once active, the content screening is not user specific, thus where a parent might want to limit a child's access to some Internet content, the parent may not want all users limited in the same manner. Other solutions to content screening, for example stand alone solutions such as Surf Watch® or Net Nanny®, while also effective at limiting access to undesirable Web Sites, generally have the same limitations with regard to other sources of Internet content as the browsers. Another limitation of the content screening provided by currently available solutions is that it is typically focused only on sex, violence and the like, and thus is directed primarily to protecting children. The need for content screening, however, can extend beyond this current focus. For example, in some corporate environments where Internet access is desirable, often it would be more desirable if that access could be readily managed beyond the level that current Browser controls make available. In addition, it would be desirable if this content screening could be effected with little or no monitoring by corporate censors.

There is a need for Internet content regulation and/or screening that is not limited to only preventing access to undesirable Web Sites. This need for regulation extends to other sources of information available through the Internet such as Electronic Mail, Chat Rooms, News Groups and the like. In addition, it would be advantageous for this Internet content regulation to be available though an integrated solution, thus simplifying control of the criteria used for the screening process. It would also be desirable if this integrated solution could be tailored to meet a variety of needs, from those of young children to those of teens, young adults and others. Thus, it would be desirable if such an integrated solution could provide interactive assistance to help direct activities where appropriate within a friendly, engaging, graphical interface.

SUMMARY

An all-in-one Web browser, sites directory, multimedia e-mail, chat rooms and entertainment environment is provided that is combined with readily managed protocols for providing content screening and/or regulation of information available through the Internet. In some embodiments, at least some of these protocols are incorporated within the software that controls the all-in-one environment. In embodiments of the present invention, a graphical interface is provided that provides a user with interactive assistance for using the all-in-one environment's functions, for example, accessing information from a Web Page or Search Engine. Some embodiments in accordance with the present invention encompass a Rocketship browser that cruises cyberspace for exciting topics of interest. Web sites, and other functions, are accessed through the Rocketship's cockpit control panel and viewed through a view port. In this manner, a user is provided with an essentially three-dimensional (3-D) environment. An interactive agent is provided within the Rocketship environment to assist users with both spoken and/or written directions. The agent thus helps to enhance an experience that is both entertaining and instructive, while allowing for more complete access to all features and functions of the environment. In some embodiments, instruction is enhanced through a point-and-click lookup feature. Thus, the user can point-and-click on a word displayed in a Web Page and be provided with a choice of methods to get additional information about the word, such as looking up the word in a dictionary, thesaurus, encyclopedia or the like.

In some embodiments, control features such as depressible buttons are shaped in accordance with their function and/or employ audio messages or sound effects. Additionally, in some embodiments these depressible buttons are larger than those found in standard Web browsers to facilitate their selection. In some embodiments in accordance with the present invention, representing at least some of the depressible buttons as rotatable arrays of such buttons enhances the 3-D feel of the environment. Thus, in addition to enhancing the feel of the environment, in this manner, an unlimited number of buttons may be provided for the selection of, for example, favorite places to visit.

In some embodiments of the present invention, maintaining lists, or other data structures, to identify locations that can be visited or contacted enhances the screening function. Data structures can also be made available to identify other individuals for the exchange of Electronic Mail and/or for contact with in Chat Rooms or the like. In some embodiments in accordance with the present inventions, some or all of these lists are maintained locally with respect to the user, and in some embodiments one or more remote locations are employed for list storage.

BRIEF DESCRIPTION OF THE DRAWINGS

The present invention may be better understood, and its numerous objects, features, and advantages made apparent to those skilled in the art by referencing the accompanying illustrations. For simplicity and ease of understanding, common numbering of elements is employed where an element is the same in different illustrations.

DETAILED DESCRIPTION

The following is a detailed description of illustrative embodiments of the present invention. As these embodiments of the present invention are described with reference to the aforementioned illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. For example, while the Figures illustrate an embodiment in accordance with the present invention that is directed to children, other embodiments can be directed to adult users. For example, in some embodiments of the present invention, content screening and or regulation is directed in a topical manner, such as all content related to a specific interest and related topics.

Figure 1:
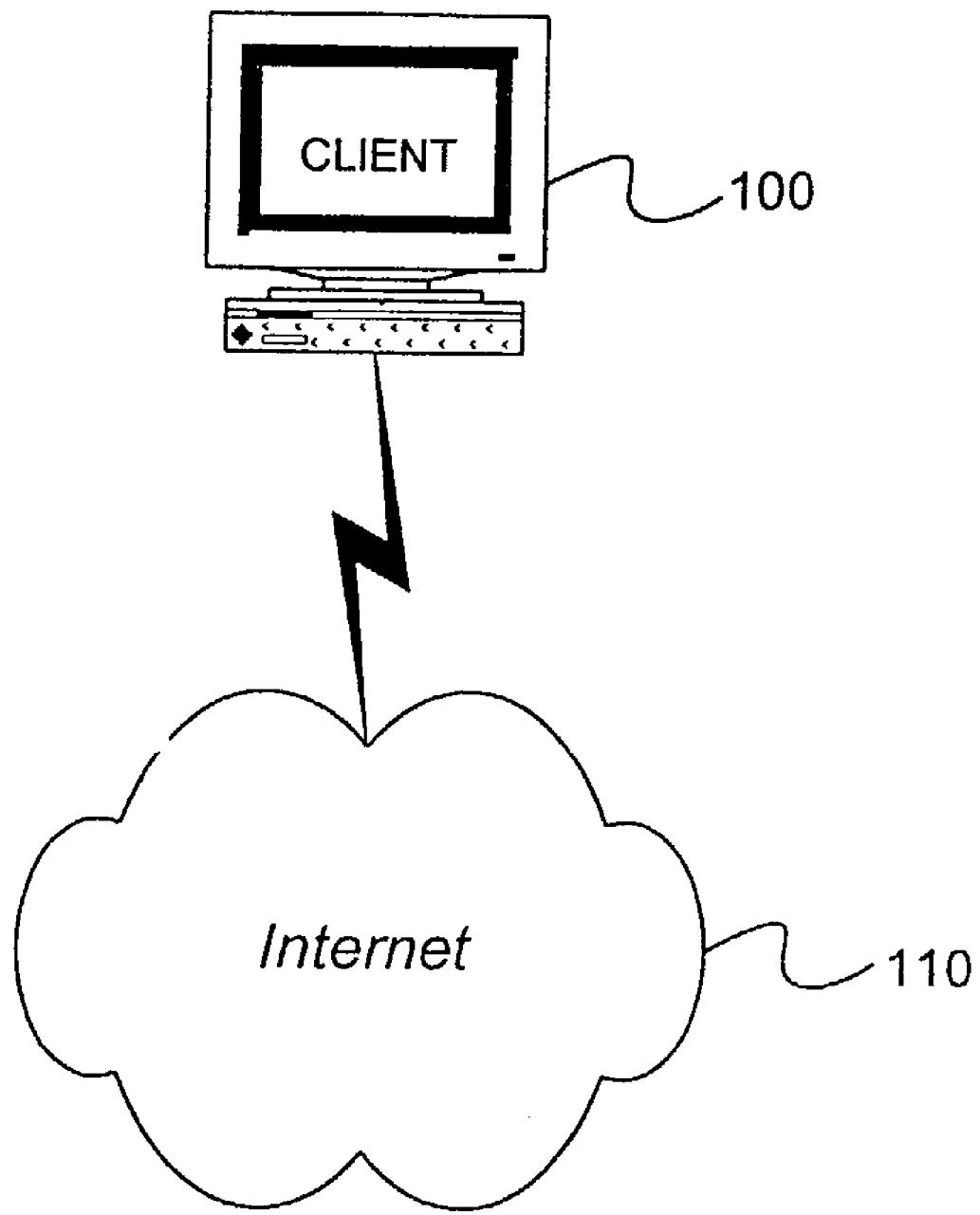
FIG. 1 is a schematic diagram illustrating a client computer connected to the internet, having a web browser with integrated features and controls in accordance with the present invention.
Figure 2:
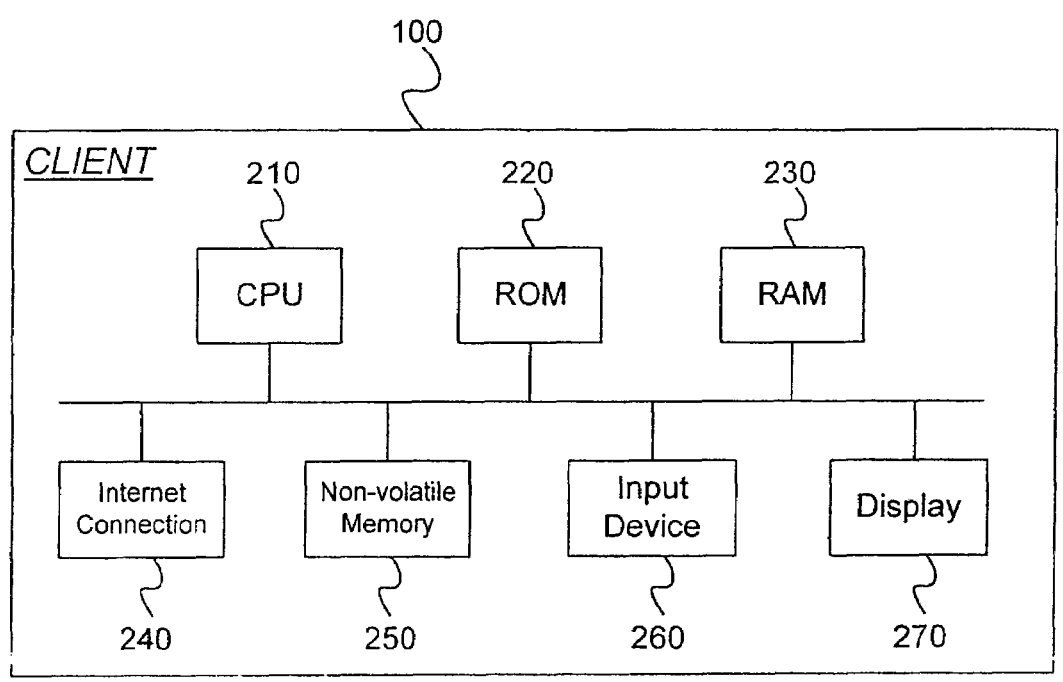
FIG. 2 is a block diagram of the client computer shown in FIG. 1, in accordance with the present invention.

Referring now to FIG. 1, a client computer 100 containing a web browser with integrated features and controls is shown connected to the Internet 110. The client computer 100 (FIG. 2) has a CPU 210, a ROM 220, a RAM 230, an Internet Connection 240, a Non-volatile Memory 250, an Input Device 260, and a Display 270.

Figure 3:
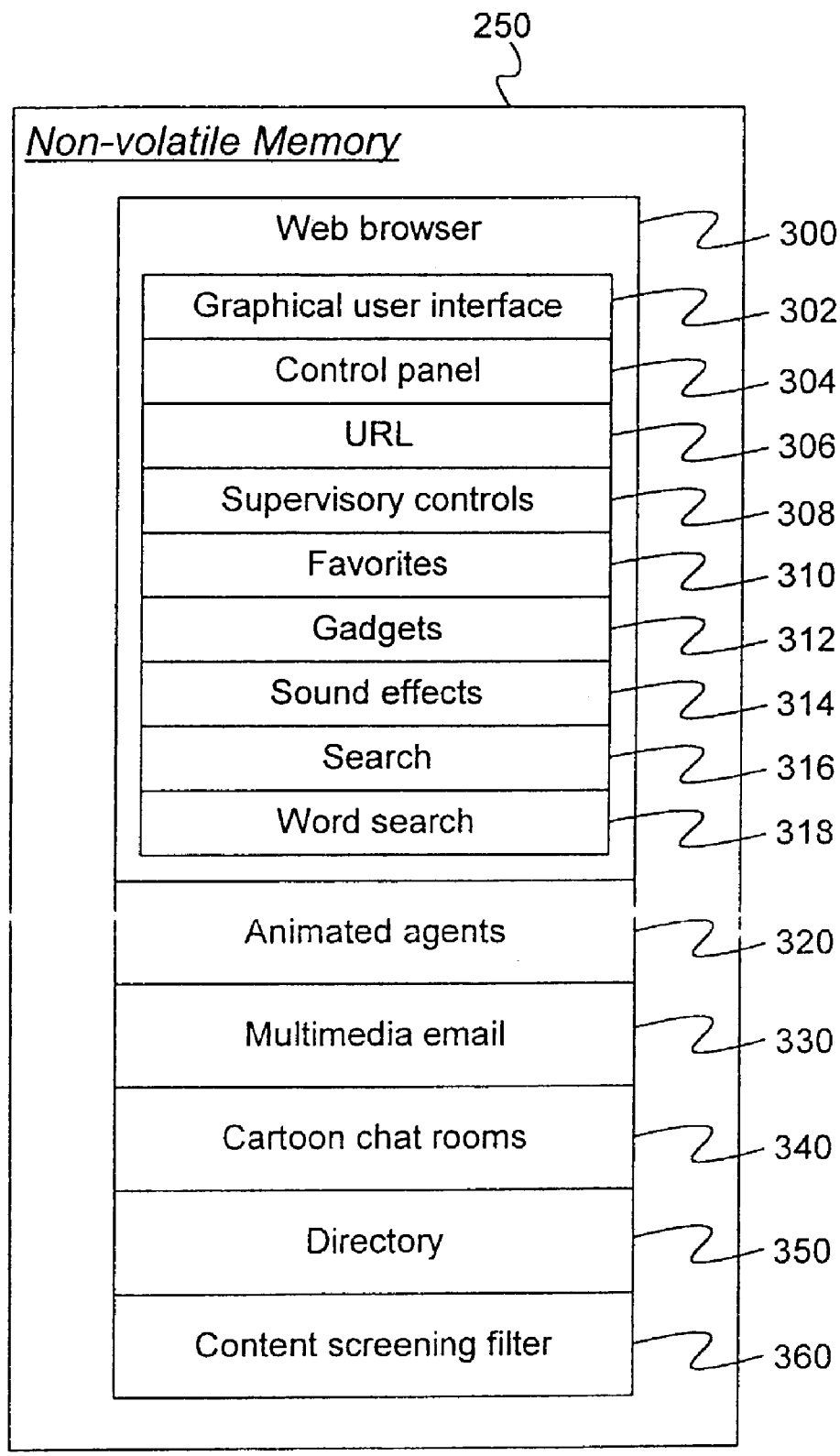
FIG. 3 is a block diagram of one embodiment of the non-volatile memory module located within the client's computer of FIG. 2.

Referring now to FIG. 3, the non-volatile memory 250 of the client computer 100 stores a web browser 300 with various integrated features and controls. The web browser 300 has a graphical user interface (GUI) 302, a control panel 304, a URL block 306, a supervisory controls feature 308, a favorites feature 310, a gadgets feature 312, a sound effects feature 314, a search engine 316, and a word search feature 318.

The GUI 302 is designed to give the web browser 300 a three-dimensional look and feel to make the web browser more appealing to a user. The control panel 304 includes web browsing buttons such as forward, back, reload, stop and home. The URL block 306 enables a user to type in and go to a specific URL address. The supervisory controls feature 308 provides control options for the supervisor of the web browser, wherein a parent can control various web browsing features for a child.

The favorites feature 310 enables a user to capture a miniaturized image of a selected page along with an associated URL for storage in a favorites window. The gadgets feature 312 provides a variety of effects which, when triggered by a user, can create visual and/or audible effects on the current page being viewed. Examples of various types of effects include: throwing simulated slime onto the screen, or create the impression of an explosion or shattering screen. The sound effects feature 314 provides various sounds and music to support many aspects of the GUI 302. The search engine 316 provides a list of search icons that link the user to search URL's that can be optimized for a children's use. The word search feature 318 enables a user to look up information on a word selected in a web page.

The web browser 300 is also designed to work interactively with an animated agents module 320, a multimedia email module 330, a cartoon chat rooms module 340, a directory 350, and a content screening filter engine 360.

Figure 4:
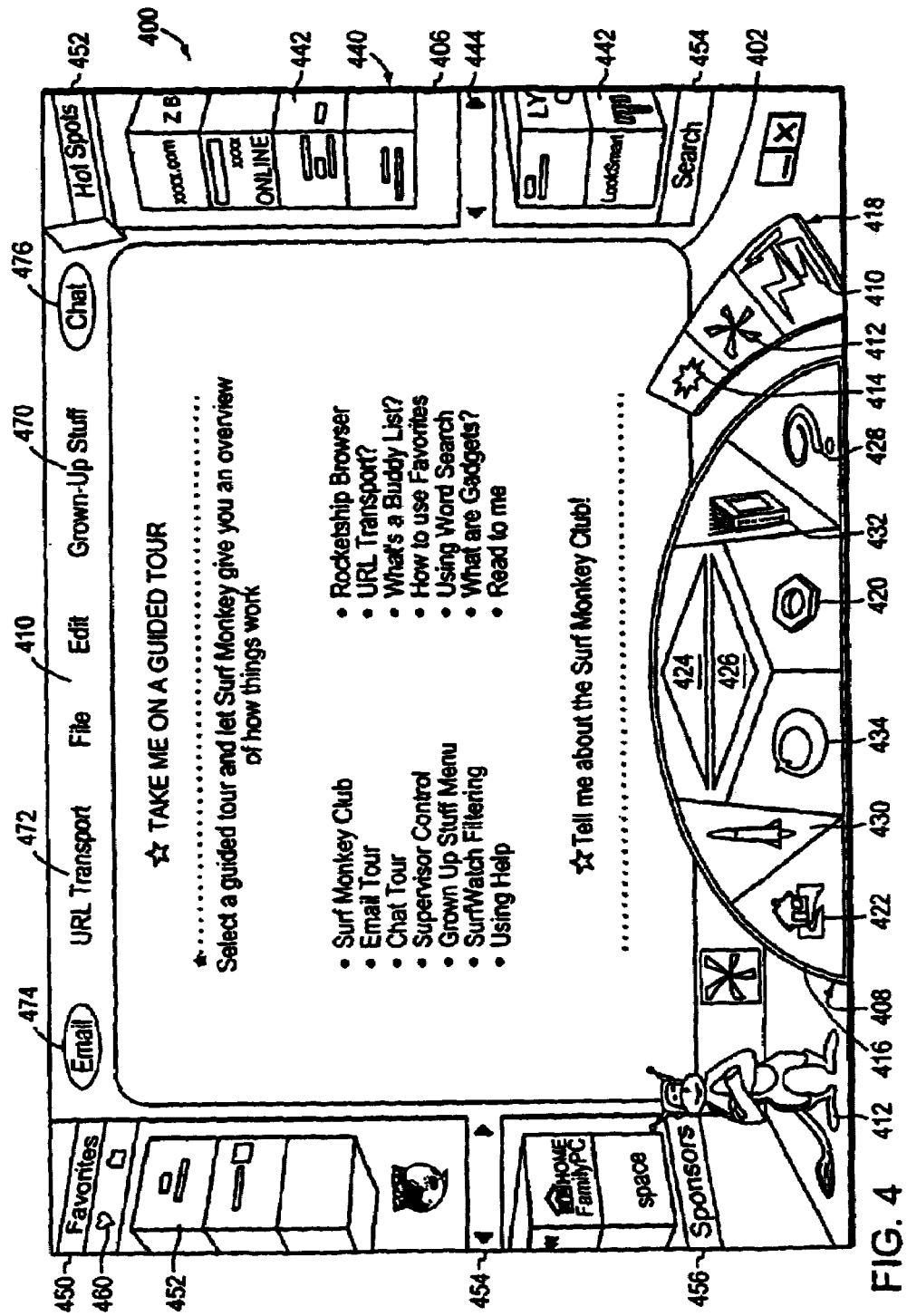
FIG. 4 is a screen capture that depicts features of an embodiment in accordance with the present invention.

Referring now to FIG. 4, a screen capture illustrating a web browser 400 is shown for an embodiment in accordance with the present invention. As seen, the web browser 400 has a three-dimensional (3-D) feel with an essentially centrally located active window 402 surrounded by an angled left widow boarder region 404, an angled right window boarder region 406, a lower control array 408 and a tool bar 410. Also shown is an animated agent 412, referred to in this web browser 400 as Surf Monkey™. The animated agent 412

It will be noted that the 3-D feel of the web browser 400 is enhanced by a variety of factors. For example, the inward angling of left and right widow borders 404 and 406, respectively, give depth to the rendering of the web browser 400. This feeling of depth is further enhanced by the perspective rendering of features within borders 404 and 406 as well as within lower control array 408. For example, the pronounced perspective rendering of buttons 410, 412 and 414.

Figure 5:
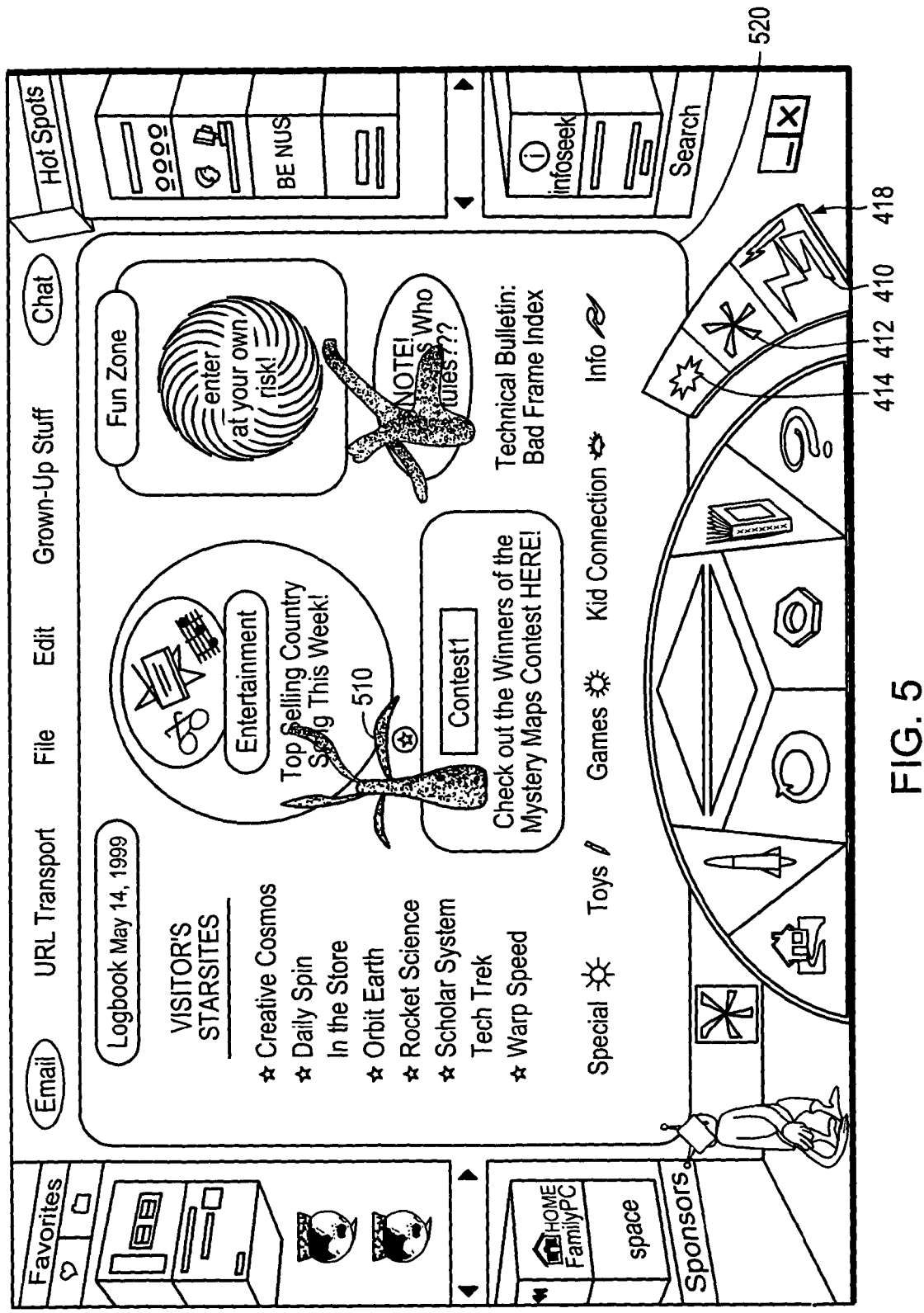
FIG. 5 is another screen capture that depicts features of an embodiment according to the present invention.

The lower control array 408 acts both to provide control options for the use of the web browser 400, and to enhance the 3-D feel of the web browser 400. Thus, control array 408 is formed larger than either left or right border regions 404 or 4066 to give the appearance that it is positioned closer to user than either border region 404 or 406. Lower control array 408 encompasses a main control array 416 and a supplemental array 418. Previously noted, perspectively rendered buttons 410, 412 and 414 are within supplemental array 418. Each button 410, 412 and 414 create an animated effect within active window 402. For example, briefly turning to FIG. 5, several "splats" 510 are seen within active window 520 as the effect of depressing button 412 with the mouse pointer. It should be noted that in some embodiments in accordance with the present invention, depressing button 412 transforms the pointer into a splat (not shown) that can then be positioned by user with the computer mouse to place splats 510 at one or more locations. Buttons 410 and 414 are used to create other animated effects within active window 520. Thus, in some embodiments, button 410 can cause active window 520 to shatter much in the manner of a glass plate, and button 410 can cause the appearance of a lightening bolt. It will be understood that these functions described for buttons 410, 412 and 414 are illustrative only and not meant to limit this or other embodiments of the present invention in any manner.

Referring to FIG. 4, main control array 416, much in the manner of the Rocketship web browser 400 is intended to represent, contains the main Web navigation controls for active window 402. In standard browsers, these controls are all generally found on the tool bar among a variety of other controls. Advantageously, these controls are positioned in a readily accessible central location that enhances the Rocketship feel of web browser 400. It will be noted that each control within main control array 416 is represented in a manner that indicates its function. Thus stop button 420 has the shape of a stop sign, home button 422 depicts a picture of a house, forward and back buttons 424 and 426, respectively, are forward and backward pointing triangles and help button 428 is a question mark. Additionally main control array 416 has a Rocketship Tour button 430, a word lookup button 432, and a refresh button 434.

Right-angled region 440 of FIG. 4 illustrates another advantageous feature of some embodiments of the present invention. Comparing the appearance of region 440 in FIG. 4 to that in FIG. 5, it can be seen that depressible buttons 442 of region 440 are partially rotated by depressing a rotation arrow 444. Buttons 442 show the content of FIG. 4 changing to another set of URL links. In this manner, Favorite listings 450 as well as listings of Hot Spots 452, Search Engines 454 and Sponsors 456 can provide many more choices than can be displayed at one time without changing the 3-D look and feel of the web browser 400. In addition, by providing rotating buttons for listings 450, 452, 454 and 456, such buttons can retain their appearance and hence will advantageously remain easily identifiable.

Other features of the web browser 400 are also enhanced or tailored for children. For example, as shown in FIG. 4, adding a Web page to a listing of Favorites 36 is accomplished by selecting heart button 460 within left boarder region 404 while a Web Page is within active window 402. The selected Web Page is represented as a depressible button 462, that is a miniature representation of the actual page selected. In this manner, the identity of such favorite sites is enhanced for children, as each favorite site is identifiable from its appearance without the need for reading a title in a textual listing of favorites. It should be noted that adding a site to Favorites listing 450 is also accompanied by an audible confirmation of the selection and animated movement of agent 412. For example, adding favorite site 462 invokes a kissing sound to confirm selection and agent 412 giving a "thumbs up" signal to the user.

Figure 6:
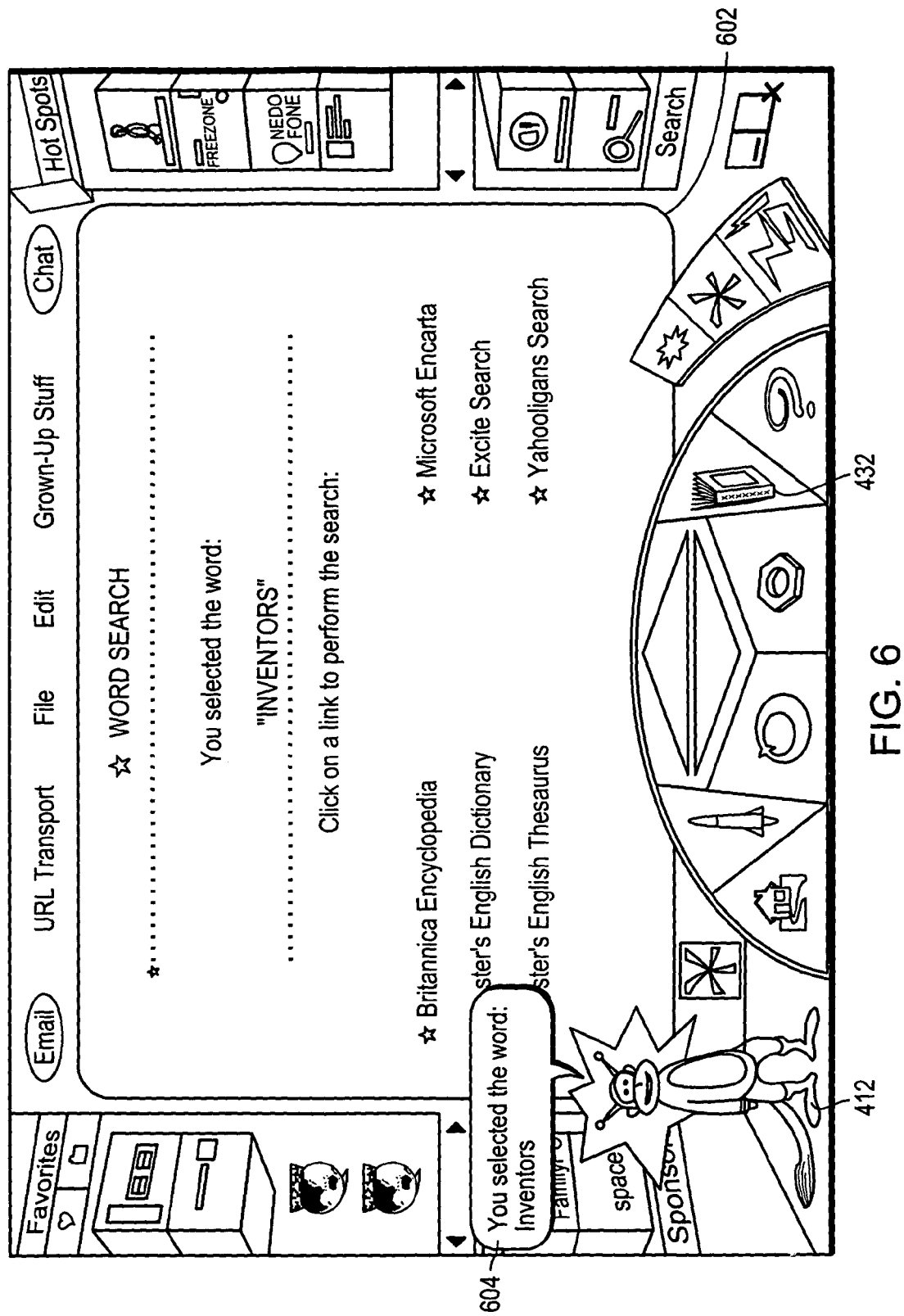
FIG. 6 is yet another screen capture that depicts features of an embodiment in accordance with the present invention.

Referring now to FIG. 6, animated agent 412 is programmed to interact with a user while a web page is displayed in active window 602. Thus, agent 412 displays, in a cartoon balloon 604, a message linked to current information and speaks the message at essentially simultaneously with each word's display within cartoon balloon 604. In this manner the interface for a young child just learning to read is enhanced. It should also be understood that other embodiments in accordance with the present invention could also take advantage of the interaction of agent 412 with the information displayed on a page displayed in active window 602. For example, in an environment (not shown) directed towards visually impaired users, having an agent that can speak the information provided on an active page, such as a Web Page or Email, is advantageous. The agent also works interactively with an embedded content screening filtering system to avoid saying words that are offensive.

Some embodiments in accordance with the present invention encompass a Word Search feature. Selecting Word Search button 432 transforms the mouse pointer (not shown) and allows for subsequent selection of a word from a web page within active window 602. For example, selecting "Inventors" from an active web page opens a Word Search Page, as seen in active window 602. As seen, agent 412 interacts with the user by displaying and speaking the text within the cartoon balloon 604 to indicate which word was selected from the previous page. A user can select any of the variety of lookup tools provided to find additional information about the selected word. Thus, where a Thesaurus option is selected, the user is linked to an on-line Thesaurus within active window 602. It will be appreciated that such a word lookup function is particularly advantageous to some users, for example children.

As previously mentioned, embodiments in accordance with the present invention can provide screening and/or regulated access to information and other forms of functionality accessible on the Internet. Embodiments in accordance with the present invention incorporate some of this control and regulation function within the software that controls aforementioned all-in-one web browser 400 (FIG. 4) and access other control and regulation functions directly from predetermined Internet based sources. Selection of a variety of supervisory functions and technical information is available by clicking on the "Grown-Up Stuff" section 470, as shown in FIG. 4. For example, a Supervisor Control page 700 (FIG. 7) can be selected and allows a supervisor to control various features of the web browser, including restriction of web-site access, chat restricting functions, email restricting functions, buddy list restricting functions, and profanity filtering function. In addition, some embodiments of the present invention provide a security agent 702 to assist selection and instruct in the use of the various supervisory options available. For example, agent 702, known as Cybot™, is shown adjacent check boxes 704 and 706, which provide for blocking access to Email and Chat functions, subsequent to an audio explanation of the use of each check box.

Access to and use of the Email and Chat functions can be controlled in various other ways in addition to content screening as previously described. For example, in some embodiments in accordance with the present invention, sending and/or receiving Email is limited to a specific list of members. Alternatively, in some embodiments sending and/or receiving Email is blocked for a list of specific users and more general access permitted. In a similar manner, some embodiments of the present invention limit access to the Chat function with lists similar to those described for the Email function. In addition to limiting the Chat function through the use of lists of users, some embodiments of the present invention also limit access to specific Chat Rooms. Thus, one or more lists of specific Chat Rooms are employed to allow and/or restrict entry to a Chat Room.

Access to the web browser 400 (FIG. 4) begins with a local login at user's computer (not shown). Generally, such a login encompasses entering a user name and password. In some embodiments of the present invention, the validity of these entries is generally checked against values stored in a local database and if correct user status is verified by accessing a remote user ID database after Internet connection is completed. In this manner, Internet access is only begun if the user ID is correct at the local level and unnecessary connections are avoided. Generally once user status is verified as either a supervisory user or a client user, the appropriate functions become available.

Figure 7:
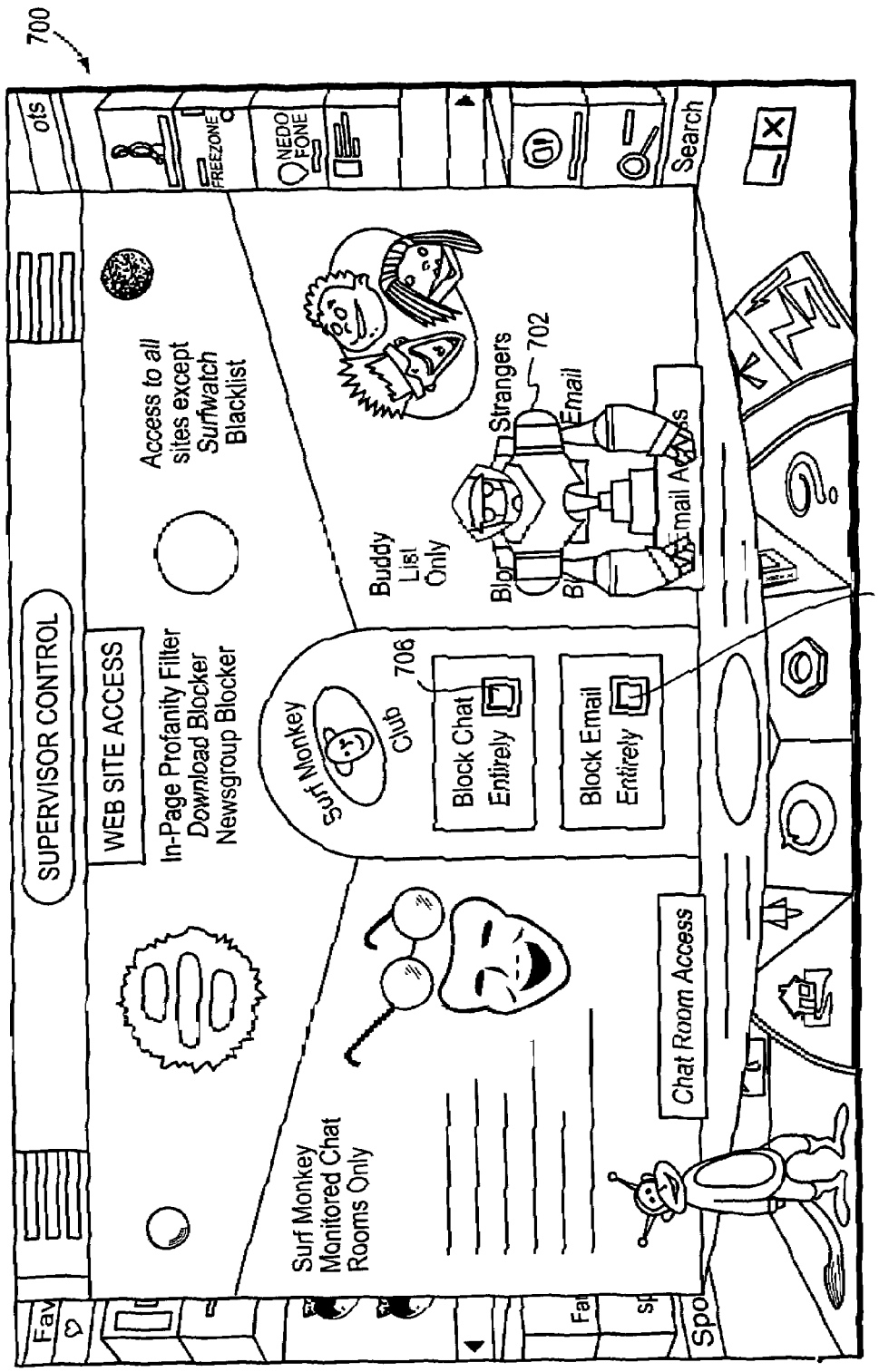
FIG. 7 is still another screen capture that depicts features of an embodiment according to the present invention.

Supervisory controls for the web browser include a variety of Internet access and content regulation functions. Thus, for example, a supervisory user can make modifications to the settings of the control functions for Email and Chat Room access as shown in FIG. 7. In other embodiments in accordance with the present invention, the supervisory user can modify other settings. Once the supervisory user has completed updating each desired setting, one or more local databases and remote databases are updated to reflect the modification.

A client user only has access to client functions. These functions generally include a call web page feature, a send/receive email feature, and a chat room feature. For example, FIG. 4 illustrates call web page features at URL links at the depressible buttons 442, 446 and at a URL transport menu option 472. The send/receive mail feature is accessible through the Email button 474, and the chat room feature can be accessed by selecting Chat 476. As each of the client functions can have unique supervisory settings, once a specific function is called, access to that function is verified by checking local and remote databases for the specific access information required. It will be understood, that while access control to a user function may at times involve a simple yes or no, at other times such access encompasses other controls. For example, once access to the send/receive email function is granted, additional controls such as restricting email to a list of pre-approved "Buddies" and/or content screening of incoming Email can be applied so that offensive words are filtered from the email. Thus once a client user gains access, local and/or remote databases will generally continue to be accessed to enable these additional controls. Generally, the data accessed from the databases is used in concert with functions embedded within all-in-one web browser 400 (FIG. 4) to effect these additional controls. In addition, in some embodiments in accordance with the present invention, real-time control and monitoring of the client user can be effected. For example, where a child client user is granted access to a chat room, an adult monitor may be present at a remote location to screen the activity of the user and others.

By now it should be realized that a system and method of an all-in-one Web browser, sites directory, multimedia e-mail, chat rooms and entertainment environment has been described that provides easily manage content control and regulation of a user's access to the Internet. As described, the all-in-one environment can be tailored to meet a variety of needs from those of young children, as indicated in illustrative FIGS. 1–7, to other users through the use of other environments and agents. Thus the use of an agent can provide both visual and audible prompts to adult users, e.g. visually impaired or elderly users, that advantageously provides an enhanced Internet experience over that possible with more traditional environments. In addition, it has been found that for young users, that the animation and interactivity of the agent allows the agent to essentially become a friend. Again advantageously providing an enhanced Internet experience for the user. Also content control and screening, as described, that can make use of both local and remote data structures in combination with embedded functionality is advantageous for Corporate Intranet and Internet users where management is seeking an easily maintained method of limiting Internet access and/or content control.

We claim:

1. An all-in-one module for Internet access stored in a computer readable-medium and executed in a computer device comprising:

a first module for identifying a client user, a second module for identifying a supervisory user, a third module for creating or modifying local content access settings for Internet/Intranet tesouroes and a local data structure for storing said settings, wherein said third module is not accessible for creating or modifying local content access settings to said client user;

a fourth module for accessing one or more remote data structures having one or more remote content access controls to Internet resources;

a fifth module for coordinating local control settings retrieved from said local data structure with said one or more remote content access controls, wherein said fifth module controls said client user's access to Internet/Intranet resources;

a first interactive agent to provide audible and visual prompts to said client user for access of Internet/Intranet resources; and a second interactive agent to provide audible and visual prompts to said supervisory user for creating said local content access settings.

2. The all-in-one module of claim 1 wherein at least one of the first agent and the second agent is animated.

3. An integrated web browser for Internet access stored in a computer readable-medium and executed in a computer device comprising:

a web access module operable to retrieve and display web pages;

a chat module integrated with the web access module and accessible from the web access module;

an email module integrated with the web access module and accessible from the web access module; and a content access control module operable to restrict content displayed by the web access module, the chat module, or the email module, the content access control module operable to identify a client user and a supervisory user wherein restrictions on content accessible to the client user is are set by the supervisory user via the integrated web browser.

4. The integrated web browser of claim 3 wherein the web access module is accessible with one click by the client user from the email module.

5. The integrated web browser of claim 3 wherein the web access module is accessible with one click by the client user from the chat module.

6. The integrated web browser of claim 3 wherein the chat module is accessible with one click by the client user from the web access module.

7. The integrated web browser of claim 3 wherein the chat module is accessible with one click by the client user from the email module.

8. The integrated web browser of claim 3 wherein the email module is accessible with one click by the client user from the web access module.

9. The integrated web browser of claim 3 wherein the email module is accessible with one click by the client user from the chat module.

10. The integrated web browser of claim 3 further comprising a word search feature that provides additional information on a selected word displayed by the chat module, the email module, or the web access module.

11. The integrated web browser of claim 3, wherein the content access control module is configured by the supervisory user via a graphical-user interface.

12. The integrated web browser of claim 11, wherein the content access control module restricts the client user from accessing a select web-site.

13. The integrated web browser of claim 11, wherein the content access control module restricts the client user from executing a chat module enabled function.

14. The integrated web browser of claim 11, wherein the content access control module restricts the client user from executing an email module enabled function.

15. The integrated web browser of claim 11, wherein the content access control module restricts the client user from exposure to at least one profane word.

16. The integrated web browser of claim 11, further comprising a security agent configured to instruct the supervisory user.

17. The integrated web browser of claim 16, wherein the security agent provides an audible explanation.

* * * * *